(12) United States Patent
Desigan et al.

(10) Patent No.: US 12,388,874 B2
(45) Date of Patent: Aug. 12, 2025

(54) SD-WAN IOT SECURITY POSTURE MANAGEMENT

(71) Applicant: Palo Alto Networks, Inc., Santa Clara, CA (US)

(72) Inventors: Arunkumar Mutharasanallur Desigan, Bangalore (IN); Vamsidhar Valluri, San Francisco, CA (US); Venkata Sarat Kumar Vajrapu, Bengaluru (IN); Gong Cheng, Sunnyvale, CA (US); Madhusudhan Donthi Nagaraju, Bangalore (IN); Anil Kumar Reddy Sirigiri, Bangalore (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 165 days.

(21) Appl. No.: 18/308,764

(22) Filed: Apr. 28, 2023

(65) Prior Publication Data

US 2024/0348652 A1    Oct. 17, 2024

Related U.S. Application Data

(60) Provisional application No. 63/495,827, filed on Apr. 13, 2023.

(51) Int. Cl.
*H04L 9/40*    (2022.01)

(52) U.S. Cl.
CPC ............ *H04L 63/20* (2013.01); *H04L 63/104* (2013.01); *H04L 63/1433* (2013.01)

(58) Field of Classification Search
CPC .... H04L 63/104; H04L 63/1433; H04L 63/20
See application file for complete search history.

(56) References Cited

U.S. PATENT DOCUMENTS

| 2015/0326532 | A1* | 11/2015 | Grant | H04L 63/0218 |
| | | | | 726/1 |
| 2016/0359872 | A1* | 12/2016 | Yadav | H04L 63/1408 |
| 2020/0366717 | A1* | 11/2020 | Chaubey | H04L 63/20 |

* cited by examiner

*Primary Examiner* — Gil H. Lee
(74) *Attorney, Agent, or Firm* — Gilliam IP PLLC

(57) ABSTRACT

Increasing use of web-based applications or Software-as-a-Service and IoT devices within enterprise networks increases the variety of network traffic and variables for consideration in managing security posture, which includes policy management. A security posture management system as disclosed herein leverages application identification and device discovery from ongoing collection and analysis of network traffic data to manage policies at device granularity allowing tailored security posture management. The system can tailor policies to handle network traffic depending on identified application and device type inputs obtained from the ongoing collection and analysis. The security posture management system can configure SD-WAN construct based parameters of a policy to tailor policies for different application traffic from different types of devices.

20 Claims, 4 Drawing Sheets

SD-WAN IOT SECURITY POSTURE MANAGEMENT

BACKGROUND

The disclosure generally relates to transmission of digital information (e.g., CPC class H04L) and network architectures for network security (e.g., CPC subclass H04L 63/00).

National Institute of Standards and Technology (NIST) Special Publication 800-128 Guide for Security-Focused Configuration Management of Information Systems defines security posture as "The security status of an enterprise's networks, information, and systems based on information security resources (e.g., people, hardware, software, policies) and capabilities in place to manage the defense of the enterprise and to react as the situation changes." This is also sometimes referred to as "security risk posture" or "risk posture." Enterprise networks can include one or more private networks across multiple branch offices and a data center and employ software-defined wide area network (SD-WAN) controllers to manage overlay and circuits (i.e., physical and/or virtual circuits of a network) that comprise the enterprise WAN. Network security devices of the private networks enforce security policies on north-south traffic and east-west traffic.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Increasing use of web-based applications or Software-as-a-Service and Internet of Things (IoT) devices within enterprise networks increases the variety of network traffic and variables for consideration in managing security posture, which includes policy management. In addition, enterprise networks are increasingly managed as SD-WANs with SD-WAN controllers to deploy policies. Typically, traffic management policies are configured for applications and enforced on corresponding application traffic regardless of device type sourcing the traffic. While file transfer protocol (FTP) traffic per se and printers per se would not be assessed as a risk, FTP traffic from a printer may be a cybersecurity risk. A security posture management system as disclosed herein leverages application identification and device discovery from ongoing collection and analysis of network traffic data to manage policies at device granularity allowing tailored security posture management. The system can tailor policies to handle network traffic depending on inputs of identified application and device type obtained from the ongoing collection and analysis. The security posture management system can configure SD-WAN construct based parameters of a policy to tailor policies for different application traffic from different types of devices. Thus, dynamic device granularity information is used to inform an organization's SD-WAN policy framework for branch security and to implement a secure access service edge (SASE) security model including a zero trust security model (i.e., all users presumed untrustworthy).

Example Illustrations

Figure 1:
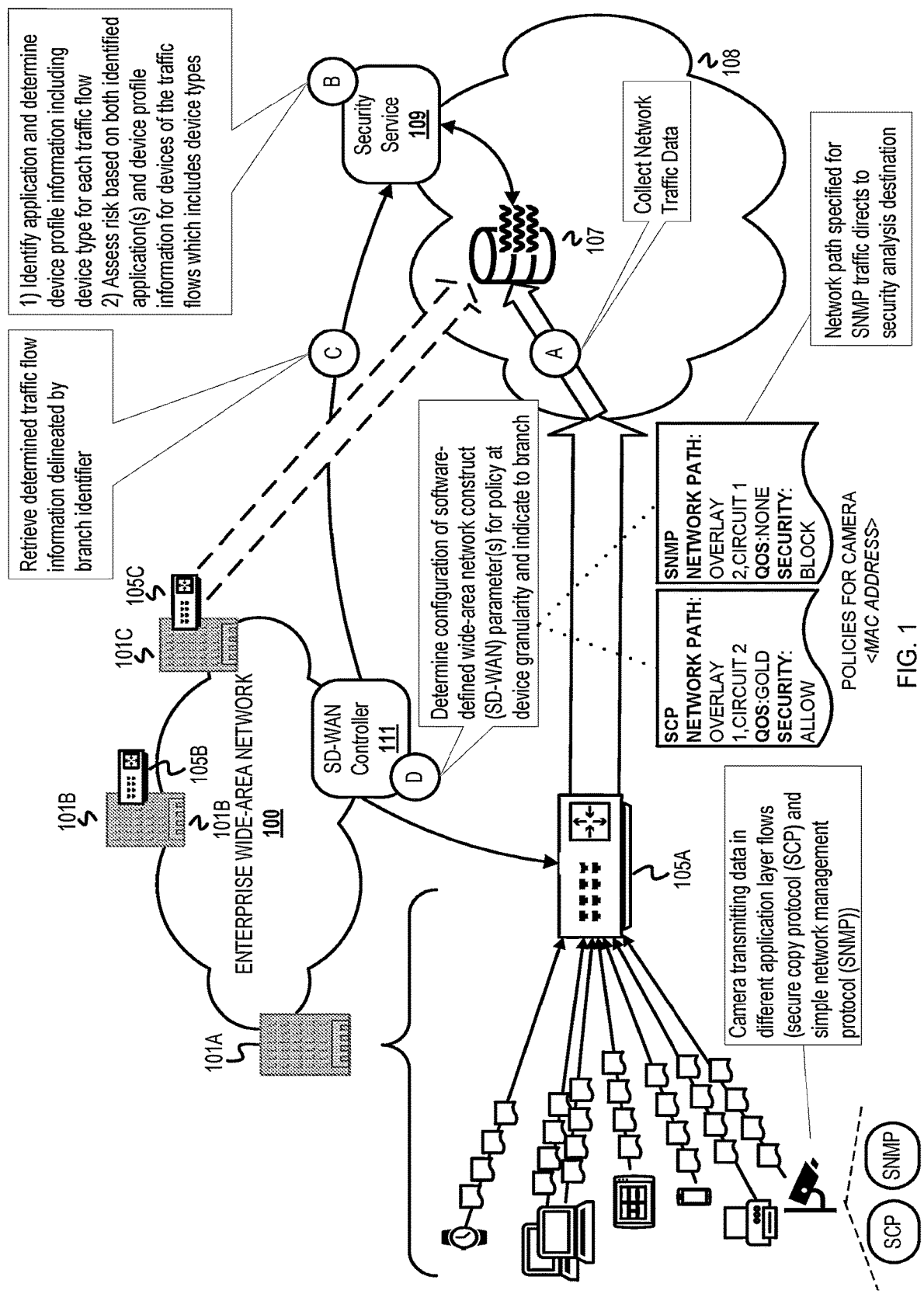
FIG. 1 is a diagram of an example system that delivers a secure access service edge (SASE) security model with device granularity policy management based on identified combinations of application and device type per traffic flow.

FIG. 1 is a diagram of an example system that delivers a secure access service edge (SASE) security model with device granularity policy management based on identified combinations of application and device type per traffic flow. An enterprise wide-area network 100 includes multiple branch sites ("branches") 101A-101C. The private network of each branch has at least one network device providing network connectivity beyond the network and providing security. In FIG. 1, the branches 101A-101C respectively have network devices 105A-105C. Each of the network devices 105A-105C includes network connectivity capabilities (e.g., switching and routing) and policy enforcement capabilities for traffic management. FIG. 1 depicts various IoT devices with corresponding network traffic at branch 101A that is transmitted via network device 105A. The depicted devices include a smartwatch, a smartphone, laptops, a tablet, a printer, and a security camera. For this illustration, it is assumed that IoT devices have been allowed to join the private network of branch 101A. Thus, the security posture of the enterprise, at least for branch 101A, is to allow devices to join without delay and manage traffic afterwards.

To implement the SASE model, a security service 109 and a data lake 107 are used for ongoing network traffic data collection and analysis. The network devices of branches 101A-101C communicate network traffic data for storage in a data lake 107 that is accessed by the security service 109. A data lake is illustrated as an example of a storage technology that allows for storage of various type of data and is remotely accessible, for example via an application programming interface (API). Embodiments can use other similar storage technologies.

An SD-WAN controller 111 is used to manage the enterprise WAN 100. A network administrator can configure policies with the SD-WAN controller 111 and deploy configured policies to network devices of the enterprise WAN 100, including devices 105A-105C. A policy typically consists of a matching rule(s) and an action. The specified action will be enforced on traffic with attributes that satisfy the matching rule(s). An action may be to block traffic, allow traffic, transmit on a selected path, transmit according to a specified quality of service (QoS), etc. Path selection, security (e.g., block, allow, quarantine), and QoS are considered SD-WAN constructs. Configuring a policy based on SD-WAN constructs involves configuring SD-WAN construct parameters. An example of configuring parameters of network path selection includes selecting a defined virtual private network (VPN) as an overlay value and a circuit available for the selected VPN. The SD-WAN controller 111 also obtains traffic flow information from the security service 109. The traffic flow information includes flow identifier, device profile information, application identity, and risk assessments. Device profile information includes device type, such as printer. Device profile information can also include manufacturer name, model number, and operating system (OS) type/version. Application identity or identifier can indicate a specific application (e.g., APP_XYZ) or a type of application (e.g., file sharing application or conferencing application). The risk assessment may be for a device or a traffic flow. Expression of the assessment will vary by implementation (e.g., risk score, warning, etc.). Information obtained from the security service 109 may cause the SD-WAN controller 111 to modify a policy already enforced on a traffic flow or device or create a new policy.

FIG. 1 is annotated with a series of stages A-D, each of which represents one or more operations. Although these stages are ordered for this example, the stages illustrate one example to aid in understanding this disclosure and should not be used to limit the claims. Subject matter falling within the scope of the claims can vary from what is illustrated.

At stage A, the system collects network traffic data from the network device 105A. The collected data can be one or more of PCAP files, traffic logs, and/or traffic samples. The data from branches 101A-101C are differentiated by flow identifiers (e.g., destination and source addresses, an assigned flow identifier, etc.) and will include identifiers that allow traffic to be distinguished by branch. Branch identifiers may be in lower layer protocol information (at least below application layer) as part of session or connection establishment.

At stage B, the security service analyses network traffic data retrieved from the data lake 107. The security service 109 analyzes the network traffic data per flow and across flows to assess risk and detect threats and determine application identities and device profile information. For risk assessment, the security service 109 may analyze traffic for threat signatures, evaluate traffic for disclosed vulnerabilities, and/or perform behavioral analysis within and across traffic flows. The combination of application identity and device type per flow can inform the behavioral analysis. For example, the security service 109 can use models to learn application traffic behaviors by device type and classify traffic of an application identity not previously transmitted by the device type as suspicious or abnormal. With disclosed vulnerabilities (e.g., vulnerabilities identified by common vulnerability enumerator (CVE)), the security service 109 can identify devices with vulnerabilities and corresponding remediations.

At stage C, the SD-WAN controller retrieves determined traffic flow information delineated by branch identifier. Retrieval of information can be triggered by different events. An example of an event that triggers retrieval is a request via a user interface. The SD-WAN controller 111 may present a user interface that is used to select a branch of the enterprise WAN 100 which generates a query to the security service with a branch identifier. Queries for updates may be automatically generated and submitted to the security service 109 according to a defined schedule. Implementations of the security posture management system may also push information from the security service to the SD-WAN controller 111. For instance, the security service 109 may detect a new traffic flow or a risk which triggers at least a prompt at the SD-WAN controller 111 if not a push of the relevant information (e.g., flow identifier and branch identifier) and prompt. If the retrieval query or push event is for a branch, then the SD-WAN controller 111 receives traffic information (i.e., device profile information, application identity, and risk assessment if any) for incoming and outgoing network traffic flows of the branch.

At stage D, the SD-WAN controller 111 determines configuration of SD-WAN construct parameter(s) for policy(ies) at device granularity. Retrieved traffic information for branch 101A includes information for a secure copy protocol (SCP) traffic flow from a camera and for a simple network management protocol (SNMP) traffic flow from the camera. The SNMP traffic flow from the camera may be determined to be a risk. The security service 109 may have detected that the camera transmitting SNMP traffic is abnormal. Alternatively, the SD-WAN controller 111 evaluates the traffic flow information against defined rules governing which types of applications can be used by which types of devices. Based on a risk assessment from the security service 109 or evaluation of rules by the SD-WAN controller 111, the SD-WAN controller 111 configures two different policies to be applied to the camera. Both policies are configured to match an identifier, such as medium access control (MAC) address, of the camera in the branch 101A. The SD-WAN controller 111 configures policy parameters based on network path selection and security to block SNMP traffic from being transmitted out of the enterprise WAN 100 while capturing and transmitting SNMP traffic for further security analysis at a destination specified as OVERLAY 2, CIRCUIT 1. The SD-WAN controller 111 configures policy parameters based on network path selection, QoS, and security settings to allow SCP traffic to be transmitted either north-south or east-west and with QoS settings that correspond to GOLD (e.g., higher bandwidth, prioritization, etc.). The network path selection parameters indicate OVERLAY 1, CIRCUIT 2, which may be the default path for traffic from the branch 101A. The deployment of the policy for SNMP traffic from the camera does impact SNMP traffic from other types of devices unless already configured. For instance, SNMP traffic from a printer or server within the branch 101A would be governed by a different policy.

The illustration depicted in FIG. 1 is an example to aid in understanding the security posture management technology disclosed herein and should not be used to limit embodiments. The enterprise WAN 100 may also include one or more data centers and support work-from-home connections. In addition, device granularity policies are not limited to being configured based on both device type and application identity. SD-WAN construct based policy parameters can be configured based on device type regardless of application identity. For instance, a device with a known vulnerability may be quarantined (all traffic blocked) until remediated (e.g., a patch installed for a software update). Moreover, the security service 109 may provide policy recommendations to the SD-WAN controller 111 based on its traffic analysis. For example, a cloud-based security service generates a verdict for a device in an enterprise WAN indicating the device has a vulnerability. Based on the verdict, the security service communicates to a SD-WAN controller of the network a policy recommendation to block traffic from the device until the vulnerability is remediated. The SD-WAN controller configures a policy to drop all network traffic from the device and communicates the drop-all policy to branch devices (e.g., firewalls, routers, etc.) that manage branch traffic. The SD-WAN controller can also configure path selection parameters in the policy or in a different policy to redirect the dropped traffic to a security analysis destination (e.g., a local security application, the security service, or another security service).

Figure 2:
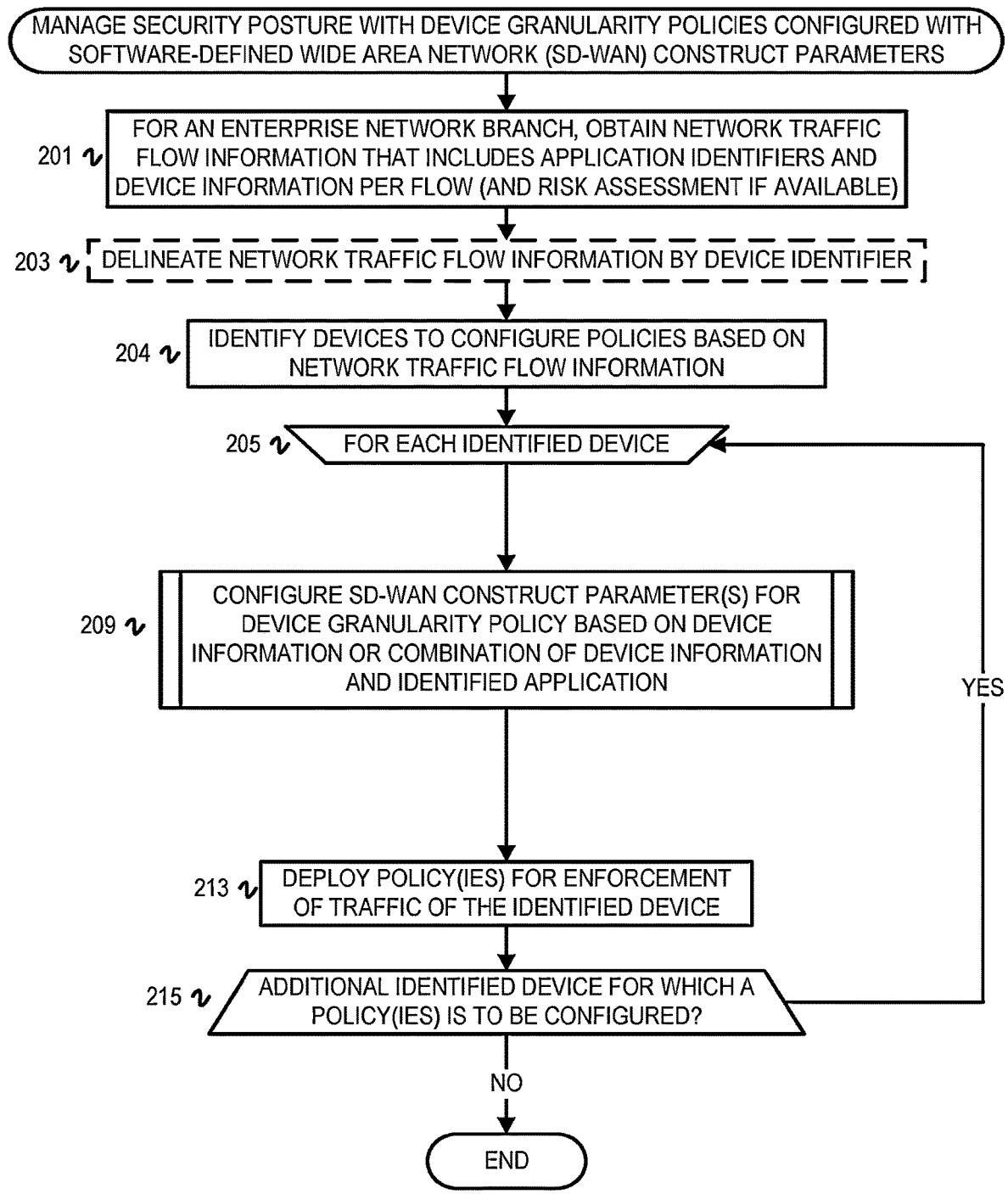
FIG. 2 is a flowchart of example operations to manage security posture with device granularity policies configured with SD-WAN construct parameters.

FIG. 2 is a flowchart of example operations to manage security posture with device granularity policies configured with SD-WAN construct parameters. For consistency with FIG. 1, example operations are described with reference to a SD-WAN controller or controller.

At block 201, the SD-WAN controller obtains network traffic flow information for an enterprise network branch. For instance, the controller may request network traffic flow in a preceding 5 minute window for a branch identified with a branch identifier in a request field. As previously stated, this information can be pushed to the controller based on push triggering event (e.g., detection of a new network traffic flow or detection of a risk). The obtained network traffic flow information includes application identifiers and device information per flow. If a flow is associated with a risk assessment, then the network traffic flow information also includes the risk assessment. The risk assessment may correspond to a device (e.g., based on OS version) or to a combination of device and application identity. In some cases, the controller obtains network traffic flow information for an enterprise WAN and processes network traffic flows by branch.

At block 203, the controller delineates network traffic flow information by device identifier. The controller can parse the network traffic flow information and organize the parsed information to delineate by device identifier. Block 203 is depicted in a dashed line to indicate the block as optional in the case of the information being already organized to delineate the information by device identifier.

At block 204, the controller identifies devices for which policies are to be configured based on the network traffic flow information. Assuming the obtained network traffic flow information is not already limited to devices and traffic flows for which policies will be configured, the controller will filter out information of devices that will not cause policy configuration. For instance, an application may be trusted regardless of device type using the application.

At block 205, the controller begins processing the network traffic flow information of each identified device. Information for a traffic flow can be implemented differently and processed accordingly. For instance, device profile information may be a record that is associated with an application identity record. Or device profile information and application identity may be indicated in a same record. An identified device may have information for multiple traffic flows. Thus, the network traffic flow information of the identified device may be organized by associating a first structure with the device profile information with a structure for each application identity for which a flow exists.

At block 209, the controller configures SD-WAN construct parameter(s) for device granularity policy based on device information or a combination of device information and identified application. Using the traffic information of the identified device and any risk assessment, one or more policies can be configured based on SD-WAN construct parameters. Example operations for block 209 are depicted in FIG. 3.

At block 213, the controller deploys the policy(ies) configured for enforcement of traffic of the identified device. For instance, the controller installs the configured policy (ies) on network devices of the branch. Implementations can instead deploy configured policies after processing the network traffic flow information.

At block 215, the controller determines whether there is an additional identified device for which a policy(ies) to be configured. If there is an additional identified device, then operational flow returns to block 205. If there is not an additional identified device, then the process ends.

Figure 3:
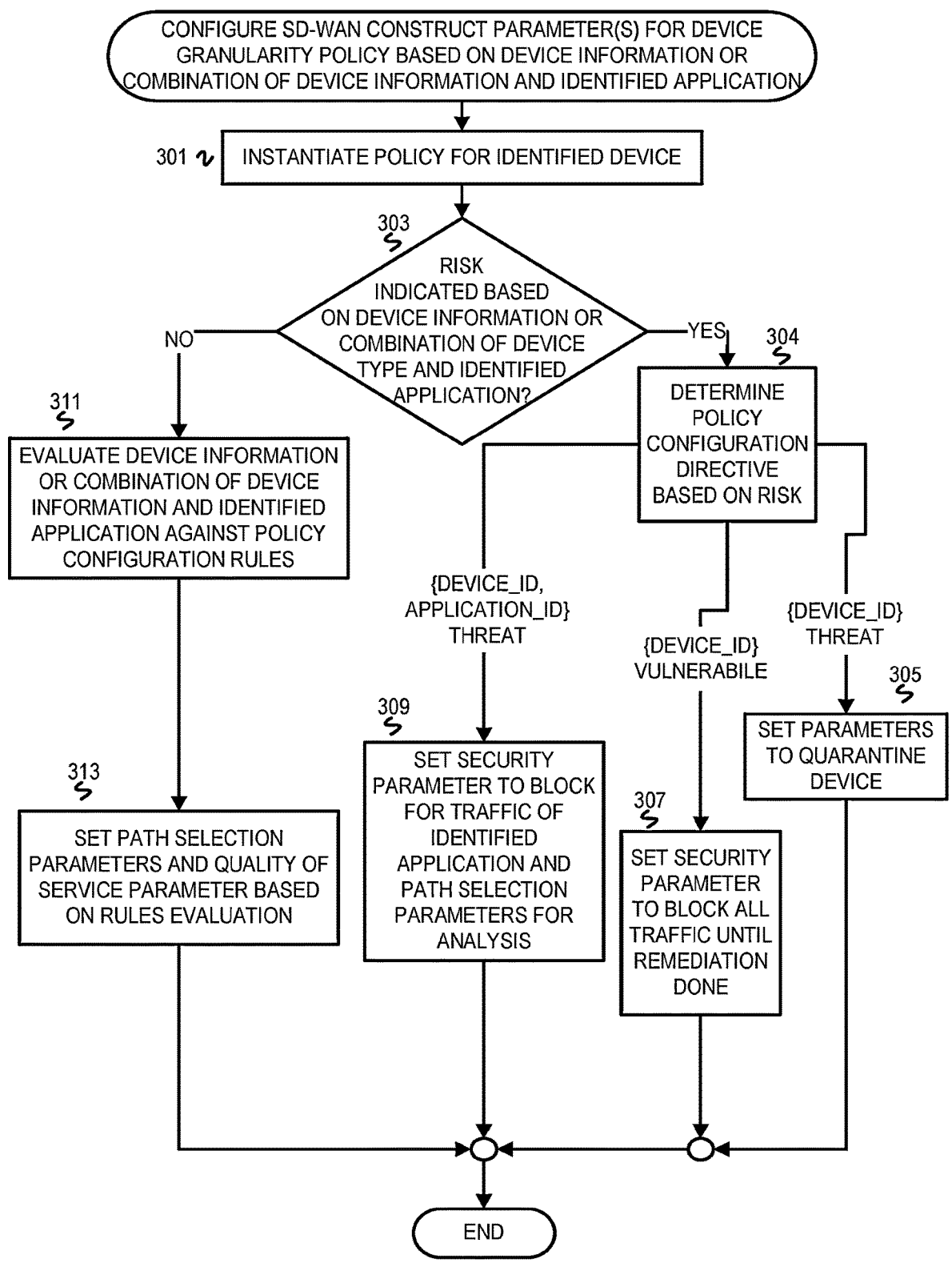
FIG. 3 is a flowchart of example operations for configuring SD-WAN construct parameter(s) for a device granularity policy based on device information or a combination of device information and identified application.

FIG. 3 is a flowchart of example operations for configuring SD-WAN construct parameter(s) for device granularity policy based on device information or a combination of device information and identified application. Multiple policies can be configured for a device. If a device has multiple traffic flows for different applications, then different policies can be configured for the different application flows and a policy can be configured based on the device itself.

At block 301, the controller instantiates a policy for the identified device. Instantiating a policy will vary by implementation. For instance, instantiating may be creating a file, creating a record in a database of policies, etc. If a policy is already specified for the identified device and is to be modified, then the controller may open the policy or access the policy for editing.

At block 303, the controller determines whether a risk is indicated based on information about the identified device or a combination of device information and identified application. The obtained traffic flow information for the identified device may indicate a risk (e.g., abnormal behavior, detected threat or attack, etc.). The risk can be indicated as a value on a risk scale or risk score or as a descriptor, such as THREAT DETECTED or a CVE identifier. If a risk is indicated, then operational flow proceeds to block 304. If no risk is indicated, then operational flow proceeds to block 311.

At block 304, the controller determines a policy configuration directive based on the indicated risk. The policy configuration directive may be based on a threat determined from both device type and application identity expressed as {device_id, application_id}, a threat determined for {device_id}, or a vulnerability determined for device_id. Determination of the policy configuration can be based on inputs via a user interface or evaluation of configuration rules. As one example, the risk and relevant information can be presented with a user interface to allow or guide selection of SD-WAN construct parameters. The example operations of FIG. 3 presume determination of policy configuration directive by rule assessment. If the risk indicated is for the combination of the device information and the application identified, then operational flow proceeds to block 309. If the indicated risk is due to a disclosed vulnerability for a device or software installed on the device, then operational flow proceeds to block 307. If the indicated risk is a threat or attack detected at the identified device, then operational flow proceeds to block 305. As an example of rule assessment for the policy configuration directive, a rule may specify that application traffic deemed a risk from a specified set of device types be directed to an analysis endpoint that is internal to an enterprise WAN while traffic of a different application and/or a different set of device types be directed to an external endpoint for a trusted cloud-based security service. This rule can specify the destination IP addresses to be used in the policy configuration, as well as the application identifiers and device types. A rule may evaluate any one or more of source address, destination address, source port, destination port, device identifier, and application identifier. Any one or more of those parameters may also be specified in a policy configuration directive.

At block 305, the controller sets policy parameters to quarantine the identified device. For instance, the controller sets parameters to block all incoming and outgoing traffic of the identified device. If the security service detecting the threat did not already generate a notification (e.g., an alarm), then the controller may also generate a notification of the attack/threat.

At block 307, the controller sets a security parameter to block all traffic until the vulnerability is remediated. For instance, the controller may set a parameter to block north-south traffic but allow east-west traffic to allow for the remediation. Or the controller can set the parameter to block all traffic depending upon the vulnerability. Blocking conditions can be specified by vulnerability or vulnerability type, and the controller can set parameters accordingly.

At block 309, the controller sets a security parameter to block traffic of the identified application at the identified device from passing through the branch perimeter. The controller also sets network path selection parameters for analysis of network traffic of the identified application generated from the identified device. If there were traffic flows of multiple applications for the identified device, then a different policy would be configured for each application. Network path selections for analysis (e.g., forensic analysis or additional security analysis) would be predefined. As mentioned earlier, the rule assessment may resolve to a directive that specifies the endpoint for redirection of traffic for analysis. Thus, the rule assessment yields policy configuration action inputs {device-id, dest-ip, app-id}. The "device-id" is the device identifier mapped from a source address for a network traffic flow, the "dest-ip" is the destination IP address for traffic redirection, and "app-id" is the identifier for traffic of the identified application. For the matching aspect of the policy configuration, the inputs may be a wildcard in the dest-ip field to match all traffic from the device and the app-id field to match the application traffic flow.

If no risk was indicated (block 303), then the controller evaluates the device information or the combination of device information and identified application against policy configuration rules at block 311. The controller first determines whether there is a policy configuration specified for any aspect of the device information. A policy configuration may be defined for device type (e.g., cameras), manufacturer (e.g., manufacturer X devices), and/or OS. The controller then determines whether there is a policy configuration specified for the combination of identified application and at least one aspect of device information (e.g., device type and application).

At block 313, the controller sets path selection parameters and a quality of service parameter based on the rules evaluation. As an example, the evaluated rule (block 311) may specify that conference or video application traffic should have a high level of QoS and a network path with greater bandwidth.

Variations

In addition to configuring a policy for a device based on information for that device (e.g., identified application, risk assessment, etc.), a security posture management system as disclosed herein can generate multiple device granularity policies based on a security service identifying a cohort of devices as collectively presenting a cybersecurity risk. The security service can identify the devices and a SD-WAN controller can then configure a policy for each of the members of the cohort of devices. The system can use a template policy configuration by device type (assuming the cohort of devices includes different device types) and then deploy an instance for each device by device identifier. The configured policy can then be deployed for enforcement on network traffic of the cohort of devices. The policies can specify the members of the cohort (e.g., persistent device identifier such as MAC address) or specify interfaces of a network device (e.g., switch) corresponding to the cohort of devices.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
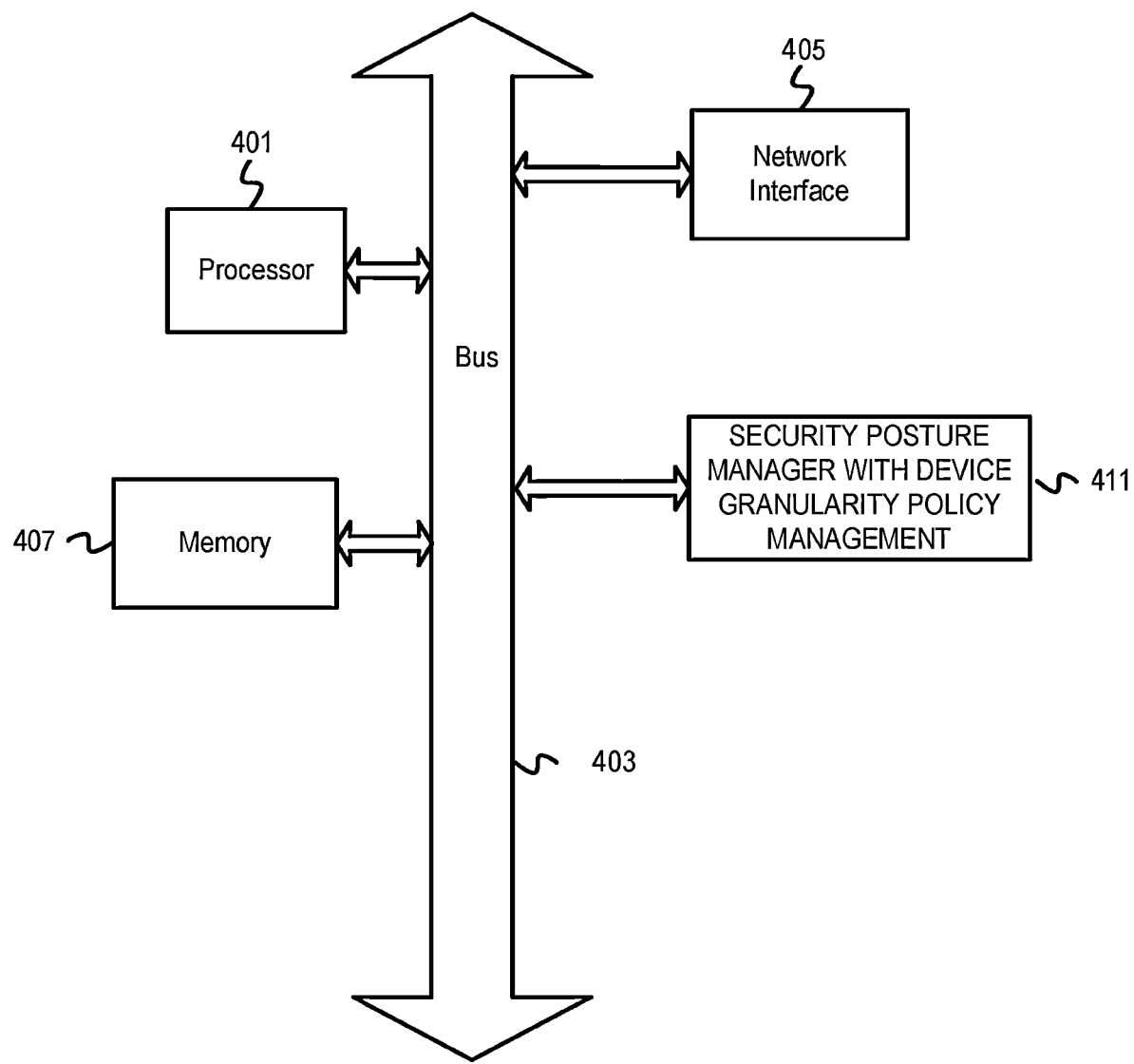
FIG. 4 depicts an example computer system with a security posture manager with device granularity policy management capabilities.

FIG. 4 depicts an example computer system with a security posture manager with device granularity policy management capabilities. The computer system includes a processor 401 (possibly including multiple processors, multiple cores, multiple nodes, and/or implementing multithreading, etc.). The computer system includes memory 407. The memory 407 may be system memory or any one or more of the above already described possible realizations of machine-readable media. The computer system also includes a bus 403 and a network interface 405. The system also includes a security posture manager 411. The security posture manager 411 configures policies at device granularity based on network traffic flow information as described above. The security posture of an enterprise network likely allows traffic to start flowing without delay to avoid interfering with user experience and delays in computing tasks being completed. However, this flexibility creates security issues. To address those security issues without sacrificing the flexibility of IoT devices within the enterprise network and use of cloud-based applications/services, the security posture manager 411 obtains the network traffic flow information of devices per branch of the enterprise network and configures policies to handle network traffic per device and can configure policies for different application traffic flows of a device. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor 401.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
identifying device type and application for each of a plurality of network traffic flows generated in a private network based, at least partly, on ongoing network traffic data collection and analysis; and
managing security posture of the private network with device granularity policies configured based on software defined wide area network (SD-WAN) constructs, wherein managing security posture of the private network with device granularity policies comprises,
obtaining a risk assessment for a first device based, at least partly, on at least one of the device type and the application identified from a first network traffic flow which corresponds to the first device;
based on the risk assessment, configuring at least a first parameter of a first policy, wherein the first parameter corresponds to one of the SD-WAN constructs which comprise network path, quality of service, and security; and
indicating the first policy for the first device.

2. The method of claim 1, wherein managing security posture of the private network with device granularity policies further comprises:
obtaining a risk assessment indicating a cohort of devices in the private network that collectively present a cybersecurity risk based, at least partly, on the device types and a set of one or more of the applications identified from multiple of the plurality of network traffic flows which correspond to the cohort of devices,
configuring a set of one or more parameters of multiple policies for the cohort of devices, wherein the set of parameters corresponds to at least one of the SD-WAN constructs; and
indicating the multiple policies for the cohort of devices.

3. The method of claim 1, wherein managing security posture of the private network with device granularity policies further comprises:
obtaining a risk assessment indicating a cohort of devices in the private network that collectively present a cybersecurity risk based, at least partly, on the device types and a set of one or more of the applications identified from multiple of the plurality of network traffic flows which correspond to the cohort of devices,
configuring a set of one or more parameters of a second policy, wherein the set of parameters corresponds to at least one of the SD-WAN constructs; and
indicating the second policy for interfaces of a hub device that communicatively couples the cohort of devices.

4. The method of claim 1, wherein parameters for network path comprise overlay and circuit, a parameter for quality of service comprises a level of service, and a parameter for security comprises block or allow.

5. The method of claim 1, wherein indicating the first policy for the first device comprises a SD-WAN controller communicating the first policy and an identifier of the first device to network security devices of the private network.

6. The method of claim 1, wherein obtaining the risk assessment comprises a SD-WAN controller receiving the risk assessment from a security service that is performing the ongoing network traffic data collection and analysis to identify device types and applications from traffic flows.

7. The method of claim 1, wherein configuring the first parameter of the first policy comprises one of instantiating the first policy for the first device and setting a value for the first parameter, changing the first parameter in the first policy to a different value, or obtaining a recommendation for the first policy and setting the first parameter.

8. The method of claim 1, wherein managing security posture of the private network with device granularity policies further comprises also obtaining a second risk assessment of the first device based on the device type identified from the first network traffic flow, wherein configuring the first policy is also based on the second risk assessment.

9. The method of claim 1, wherein configuring at least the first parameter of the first policy comprises configuring the first parameter to block network traffic of the identified application if from the first device, configuring the first parameter to change a network path selection for network traffic of the identified application from the first device, configuring the first parameter to change a quality of service for network traffic of the identified application from the first device, or configuring the first parameter to quarantine the first device.

10. One or more non-transitory machine-readable media having stored thereon program code comprising instructions to:
   obtain network traffic flow information for each of a plurality of network traffic flows generated in a private network based, at least partly, on ongoing network traffic data collection and analysis, wherein the network traffic flow information comprises identified device type and application; and
   manage security posture of the private network with device granularity policies configured based on software defined wide area network (SD-WAN) constructs, wherein the instructions to manage security posture of the private network with device granularity policies comprise instructions to,
      obtain risk assessments for a set of one or more devices corresponding to the plurality of network traffic flows; and
      for each of the set of devices,
         based on at least one of the device type and the application identified from the network traffic flow of the device and one of the risk assessments corresponding to the device, create or retrieve a policy for the device and configure at least a first parameter of the policy, wherein the first parameter corresponds to one of the SD-WAN constructs which comprise network path, quality of service, and security; and
         indicate the policy for enforcement on network traffic of the device.

11. The non-transitory machine-readable media of claim 10, wherein the instructions to manage security posture of the private network with device granularity policies further comprise instructions to:
   determine that the risk assessments indicate a cohort of the set of devices collectively present a cybersecurity risk,
   create multiple policies for the cohort of devices and configure a set of one or more parameters of the multiple policies; and
   indicate the multiple policies for enforcement on network traffic of the cohort of devices.

12. The non-transitory machine-readable media of claim 10, wherein the instructions to manage security posture of the private network with device granularity policies further comprise instructions to:
   determine that the risk assessments indicate a cohort of the set of devices collectively present a cybersecurity risk,
   create a second policy for the cohort of devices and configure a set of one or more parameters of the second policy; and
   indicate the second policy for enforcement on network interfaces of a network device, wherein the network interfaces correspond to the cohort of devices.

13. The non-transitory machine-readable media of claim 10, wherein the instructions to obtain the network traffic flow information and the risk assessments comprise instructions to retrieve at least identified device types and applications and risk assessments from a security service that is performing the ongoing network traffic data collection and analysis.

14. The non-transitory machine-readable media of claim 10, wherein the instructions to configure the first parameter of a policy comprise instructions to set a value for the first parameter, change the first parameter to a different value, or obtain a recommendation corresponding to a risk assessment and set the first parameter according to the recommendation.

15. The non-transitory machine-readable media of claim 10, wherein the instructions to configure at least the first parameter of the policy for a first of the set of devices comprise instructions to configure the first parameter to block network traffic from the first device if the network traffic is of the identified application of a network traffic flow of the first device, configure the first parameter to change a network path selection for network traffic of the identified application from the first device, configure the first parameter to change a quality of service for network traffic of the identified application from the first device, or configure the first parameter to quarantine the first device.

16. The non-transitory machine-readable media of claim 10, wherein the program code further comprises instructions to:
   determine that the network traffic flow information indicates a first and a second application identified from network traffic flows of a first of the set of devices,
   wherein the instructions to configure the policy for the first device comprise the instructions to configure the policy based on the first application identified from the network traffic flows of the first device,
   wherein the instructions to manage security posture of the private network with device granularity policies comprise instructions to create a second policy for the first device and configure the second policy based on the identified second application.

17. An apparatus comprising:
   a processor; and
   a machine-readable medium having stored thereon program code executable by the processor to cause the apparatus to,
   obtain network traffic flow information for each of a plurality of network traffic flows generated in a private network based, at least partly, on ongoing network traffic data collection and analysis, wherein the network traffic flow information comprises identified device type and application; and
   manage security posture of the private network with device granularity policies configured based on software defined wide area network (SD-WAN) constructs, wherein managing security posture of the private network with device granularity policies comprises,
      obtain risk assessments for a set of one or more devices corresponding to the plurality of network traffic flows;
      for each of the set of devices,
         based on at least one of the device type and application identified from the network traffic flow of the device and one of the risk assessments corresponding to the device, create or retrieve a policy for the device and configure at least a first parameter of the policy, wherein the first parameter corresponds to one of the SD-WAN constructs which comprise network path, quality of service, and security; and
         indicate the policy for enforcement on network traffic of the device.

18. The apparatus of claim 17, wherein the instructions to manage security posture of the private network with device granularity policies further comprise instructions to:

determine that the risk assessments indicate a cohort of the set of devices collectively present a cybersecurity risk, create multiple policies for the cohort of devices and configure a set of one or more parameters of the multiple policies; and indicate the multiple policies for enforcement on network traffic of the cohort of devices.

19. The apparatus of claim 17, wherein the instructions to manage security posture of the private network with device granularity policies further comprise instructions to:

determine that the risk assessments indicate a cohort of the set of devices collectively present a cybersecurity risk, create a second policy for the cohort of devices and configure a set of one or more parameters of the second policy; and indicate the second policy for enforcement on network interfaces of a network device, wherein the network interfaces correspond to the cohort of devices.

20. The apparatus of claim 17, wherein the instructions to obtain the network traffic flow information and the risk assessments comprise instructions to retrieve at least identified device types and applications and risk assessments from a security service that is performing the ongoing network traffic data collection and analysis.

* * * * *